D. F. MORGAN.
PORTABLE SUPPORT.
APPLICATION FILED NOV. 8, 1916.

1,259,265.

Patented Mar. 12, 1918.

Inventor
D. F. Morgan.

UNITED STATES PATENT OFFICE.

DOCTOR F. MORGAN, OF LAKE PLACEDO, TEXAS.

PORTABLE SUPPORT.

1,259,265.	Specification of Letters Patent.	Patented Mar. 12, 1918.

Application filed November 8, 1916. Serial No. 130,140.

*To all whom it may concern:*

Be it known that I, DOCTOR F. MORGAN, a citizen of the United States, residing at Lake Placedo, in the county of Victoria and State of Texas, have invented certain new and useful Improvements in Portable Supports; and I do hereby declare the following to be a full, clear, and exact description of the invention, such as will enable others skilled in the art to which it appertains to make and use the same.

This invention has for its object to provide an improved portable support, particularly designed for facilitating transportation of barrels and other cylindrical objects.

Another object is the provision of a portable support embodying a pair of supporting rockers and pivoted legs adapted to coöperate therewith when the frame of the portable support is oscillated to cause the latter to move either forwardly or rearwardly in a step by step manner.

Another object is the provision of means for holding the barrel or other object in position upon the frame of the portable support.

A still further object is the provision of a pair of auxiliary supporting frames, whereby the portable support is held in position against tilting, when not in use, and which are so constructed as to be utilized as handle levers to facilitate transportation of the portable support.

With these and other objects in view, the invention consists in the novel construction, combination and arrangement of parts as will be hereinafter specifically described, claimed and illustrated in the accompanying drawings, in which:

Figure 1:
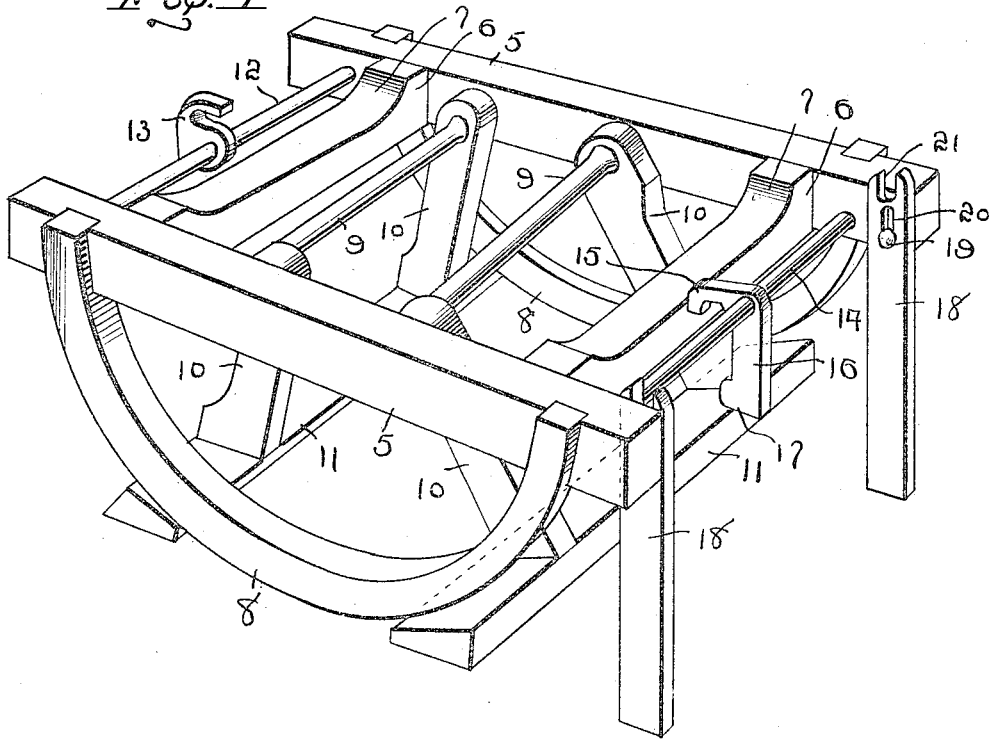
Figure 1 represents a perspective view of the portable support.

Referring to the drawing in detail, wherein similar reference numerals designate corresponding parts throughout the several views, the frame of the portable support includes a pair of longitudinal or side members 5, which are connected adjacent their ends by the transverse members 6 having recesses 7 therein to accommodate a barrel or other cylindrical object.

The side members 5 carry substantially semicircular rockers 8. Inwardly of the transverse members 6, the side members 5 are connected by hinge rods 9, to which are pivotally secured pairs of legs 10, carrying feet or base members 11 at their lower ends. The base members 11 are substantially wedge-shaped in cross section, and the relatively narrow longitudinal edges thereof are directed toward the center of the frame of the truck, and are adapted to coöperate with the rockers 8, when the truck is oscillated, to transport the latter from place to place.

One end of the side members 5 are connected by a rod 12, carrying a relatively stationary barrel retaining hook 13, the beak of which is adapted to embrace the protruding flange at one end of the barrel to retain the latter against longitudinal movement upon the main frame of the portable support. A rod 14 connects the opposite ends of the side members 5 and pivotally supports a barrel-engaging hook 15, which is connected with an angularly directed arm 16, having an enlarged lower terminal 17 constituting a weight, whereby the beak of the hook 15 is retained in engagement with the flange at the opposite end of the barrel by gravity acting upon the weighted end of the arm 16.

A pair of auxiliary legs 18 are pivotally connected at 19 to the side members 5 outwardly of the rod 14 and the pivot pins 19 are received within longitudinally elongated slots 20 formed in the auxiliary legs, whereby the latter may have pivotal and slidable movement with relation to the side members 5. The auxiliary legs 18 are of such length as to engage the floor or other support, when swung to a vertical position, as shown in Fig. 1, so as to support the portable support and prevent it from rocking.

Figure 2:
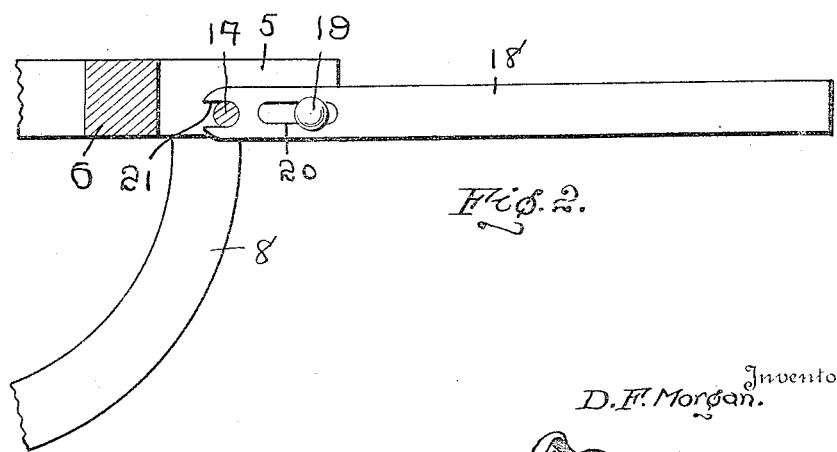
Fig. 2 represents a fragmentary sectional view, showing one of the auxiliary legs swung into position for use as a hand lever.

The ends of the auxiliary legs 18 are formed with recesses 21 of such size as to receive the rod 14 when the legs are swung to a horizontal position, as shown in Fig. 2.

In use, a barrel, (not shown) or other object, is positioned on end and the transverse members 6 of the frame are tilted against the object, and the flange at one end of the barrel or other object is engaged under the beak of the hook 13 and the beak of the other hook 15 is subsequently engaged with the protruding flange at the opposite end of the barrel. The object and portable support are subsequently moved to a horizontal position either by pulling upon one of the legs 18 or by tilting the object back upon the support. The weighted terminal 17 of the arm 16 retains the beak of the hook 15 in firm engagement with the flange at the adjacent end of the barrel by gravity. The object is normally supported in a horizontal position upon the portable support and when the latter is utilized for supporting barrels the contents of the latter may be conveniently dispensed when in this position. When it is desired to move the portable truck, to permit the floor thereunder to be cleaned or for any other reason, the auxiliary legs 18 are moved outwardly, with relation to the pivot pins 19, and are swung to a horizontal position, and subsequently swung inwardly so as to engage the bar or rod 14 in the U-shaped terminals 21 of the auxiliary legs. For convenience in tilting the barrel to entirely empty the latter, the auxiliary legs 18 may be swung inwardly underneath the rockers 8, and the adjacent base member 11 swung outwardly, thus permitting the frame to be rocked to an inclined position. In this position, the legs may be utilized as hand levers for tilting the truck to dispense the contents of the barrel or other container supported thereon or to oscillate the truck in such manner as to cause it to move from place to place. From the foregoing, it is evident that I have provided an improved portable support by which a heavy barrel or other object may be conveniently handled by one person, and, although the support is primarily designed for use in connection with barrels, kegs and similar objects, it will be understood that it may be utilized for supporting and transporting various other objects.

What I claim is:

1. A portable support comprising a frame, rockers carried by said frame, and pivoted legs carried by said frame adapted to coöperate with the rockers during transportation of the portable support.

2. A portable support including a frame, pairs of rockers carried by said frame, pairs of legs pivotally secured to said frame, and base members carried by said legs arranged on opposite sides of the lower portion of the rockers and adapted to coöperate therewith during oscillation of the frame to transport the latter.

3. A portable support including a frame, rockers carried by said frame, legs pivotally secured to said frame and adapted to coöperate with said rockers, and auxiliary legs carried by said frame for supporting the latter.

4. A portable support including a frame; rockers carried by said frame; legs adapted to coöperate with said rockers to transport the frame; and auxiliary legs carried by said frame adapted, when moved to a vertical position, to support said frame and movable to a horizontal position to provide handles for transporting the frame.

5. A portable support including a frame, rockers carried by said frame, legs associated with said rockers, auxiliary legs pivotally secured to said frame for supporting the latter in a horizontal position, and means adapted to coöperate with said auxiliary legs to secure the latter in a horizontal position.

6. A portable support including a frame, rockers carried by the frame, and pivoted legs for supporting the frame in a horizontal position and adapted to be swung underneath the frame to permit the latter to be tilted.

In testimony whereof I affix my signature in presence of two witnesses.

DOCTOR F. MORGAN.

Witnesses:
 JOHN E. KING,
 FRANK POLKA, JR.

Copies of this patent may be obtained for five cents each, by addressing the "Commissioner of Patents, Washington, D. C."